(12) United States Patent
Satyaseelan et al.

(10) Patent No.: US 10,352,422 B2
(45) Date of Patent: Jul. 16, 2019

(54) ROTOR CARRIER AND FLANGE ASSEMBLY

(71) Applicant: Schaeffler Technologies AG & Co. KG, Herzogenaurach (DE)

(72) Inventors: Ayyalraju Satyaseelan, Wooster, OH (US); Matthew Payne, Glenmont, OH (US); Markus Steinberger, Macedonia, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 171 days.

(21) Appl. No.: 15/683,421

(22) Filed: Aug. 22, 2017

(65) Prior Publication Data

US 2018/0062469 A1    Mar. 1, 2018

Related U.S. Application Data

(60) Provisional application No. 62/378,533, filed on Aug. 23, 2016.

(51) Int. Cl.
| | |
|---|---|
| *H02K 1/28* | (2006.01) |
| *H02K 7/10* | (2006.01) |
| *F16H 41/24* | (2006.01) |
| *H02K 11/225* | (2016.01) |
| *H02K 1/02* | (2006.01) |
| *H02K 1/22* | (2006.01) |
| *H02K 7/00* | (2006.01) |
| *H02K 7/108* | (2006.01) |
| *H02K 1/27* | (2006.01) |
| *B60K 6/26* | (2007.10) |
| *B60K 6/442* | (2007.10) |
| *F16D 48/06* | (2006.01) |
| *F16H 45/02* | (2006.01) |

(52) U.S. Cl.
CPC ............ *F16H 41/24* (2013.01); *H02K 1/02* (2013.01); *H02K 1/223* (2013.01); *H02K 1/278* (2013.01); *H02K 1/28* (2013.01); *H02K 7/006* (2013.01); *H02K 7/108* (2013.01); *H02K 11/225* (2016.01); *B60K 6/26* (2013.01); *B60K 6/442* (2013.01); *F16D 48/064* (2013.01); *F16H 45/02* (2013.01)

(58) Field of Classification Search
CPC .......... H02K 1/28; H02K 1/30; H02K 11/225; H02K 7/006; H02K 7/108; H02K 7/10; H02K 7/1008; H02K 7/102; B60K 6/26; B60K 6/442; F16D 48/064; F16H 41/24; F16H 45/02
USPC .............. 310/75 R, 78, 76, 92, 100; 60/435
See application file for complete search history.

(56) References Cited

U.S. PATENT DOCUMENTS

| | | | |
|---|---|---|---|
| 2013/0192947 A1* | 8/2013 | Frait | B60K 6/387 192/3.32 |
| 2013/0193816 A1* | 8/2013 | Iwase | H02K 7/003 310/75 R |

(Continued)

*Primary Examiner* — Michael Andrews
(74) *Attorney, Agent, or Firm* — Kevin L. Parks

(57) ABSTRACT

A rotor assembly includes a torque converter including a housing forming a hydraulic chamber, a rotor for an electric motor, a rotor carrier non-rotatably connected to the rotor that is fixed to the torque converter housing, a rotor carrier flange, a spring, and a snap ring. In some embodiments, the rotor carrier includes a groove and a castellated portion, the snap ring is disposed in the groove, and the spring clamps the rotor carrier flange between the snap ring and the castellated portion.

11 Claims, 4 Drawing Sheets

(56) References Cited

U.S. PATENT DOCUMENTS

2016/0084363 A1* 3/2016 Steinberger ............. F16H 45/00
  192/3.28
2016/0105060 A1   4/2016 Lindemann et al.
2019/0040917 A1* 2/2019 Persinger ................ F16D 13/30

* cited by examiner

US 10,352,422 B2

ROTOR CARRIER AND FLANGE ASSEMBLY

TECHNICAL FIELD

The present disclosure relates generally to a hybrid module, and more specifically to a rotor carrier assembly.

BACKGROUND

Rotor assemblies are known. One example is shown and described in commonly-assigned United States Patent Publication No. 2016/0105060, hereby incorporated by reference as if set forth fully herein.

BRIEF SUMMARY

Example aspects broadly comprise a rotor assembly including a torque converter having a housing forming a hydraulic chamber, a rotor for an electric motor, a rotor carrier non-rotatably connected to the rotor, wherein the rotor carrier is fixed to the torque converter housing. The rotor assembly also includes a rotor carrier flange, a spring, and a snap ring. In some embodiments, the rotor carrier includes a groove and a castellated portion, the snap ring is disposed in the groove, and the spring clamps the rotor carrier flange between the snap ring and the castellated portion. In an example embodiment, the spring is a diaphragm spring and is disposed axially between the snap ring and the rotor carrier flange.

In some embodiments, the rotor assembly further includes a retention element disposed between the spring and the snap ring. In an example embodiment, the retention element is a shim having at least one tab, and the at least one tab is bent toward the snap ring such that the at least one tab contacts at least a portion of the snap ring to secure the snap ring in the groove. In other embodiments, the spring includes at least one retaining tab positioned under the snap ring to secure the snap ring in the groove. The at least one retaining tab may be integrally formed with the spring.

Other embodiments disclose a rotor assembly comprising a torque converter including a housing forming a hydraulic chamber, a rotor for an electric motor, a rotor carrier non-rotatably connected to the rotor that is fixed to the torque converter housing, and a rotor carrier flange including an inner diameter. The rotor assembly further includes a spring and a snap ring including a first end opposite a second end. The rotor carrier includes a groove and a castellated portion, wherein the snap ring first end is disposed in the rotor carrier groove. The spring urges the rotor carrier flange into contact with the rotor carrier. In some embodiments, the spring is disposed axially between the rotor carrier flange and the castellated portion. In other embodiments, the rotor carrier flange includes a groove formed in the inner diameter and the snap ring second end is disposed in the groove of the rotor carrier flange. The rotor carrier groove may be radially aligned with the rotor carrier flange groove.

BRIEF DESCRIPTION OF THE DRAWINGS

The nature and mode of operation of the present disclosure will now be more fully described in the following detailed description taken with the accompanying drawing figures, in which.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In general, it is important that the rotor of an electric motor does not move relative to its position at the time of calibration to prevent degradation of performance and to prevent excessive imbalance. Embodiments disclosed herein provide a two-piece design that uses a rotor carrier fixed to a torque converter cover by bolts sealed to the cover. The disclosed embodiments provide several advantages that include maintaining the position of the rotor within a hybrid module, thereby improving performance characteristics and preventing imbalance that results from undesirable rotor movement.

Figure 1:
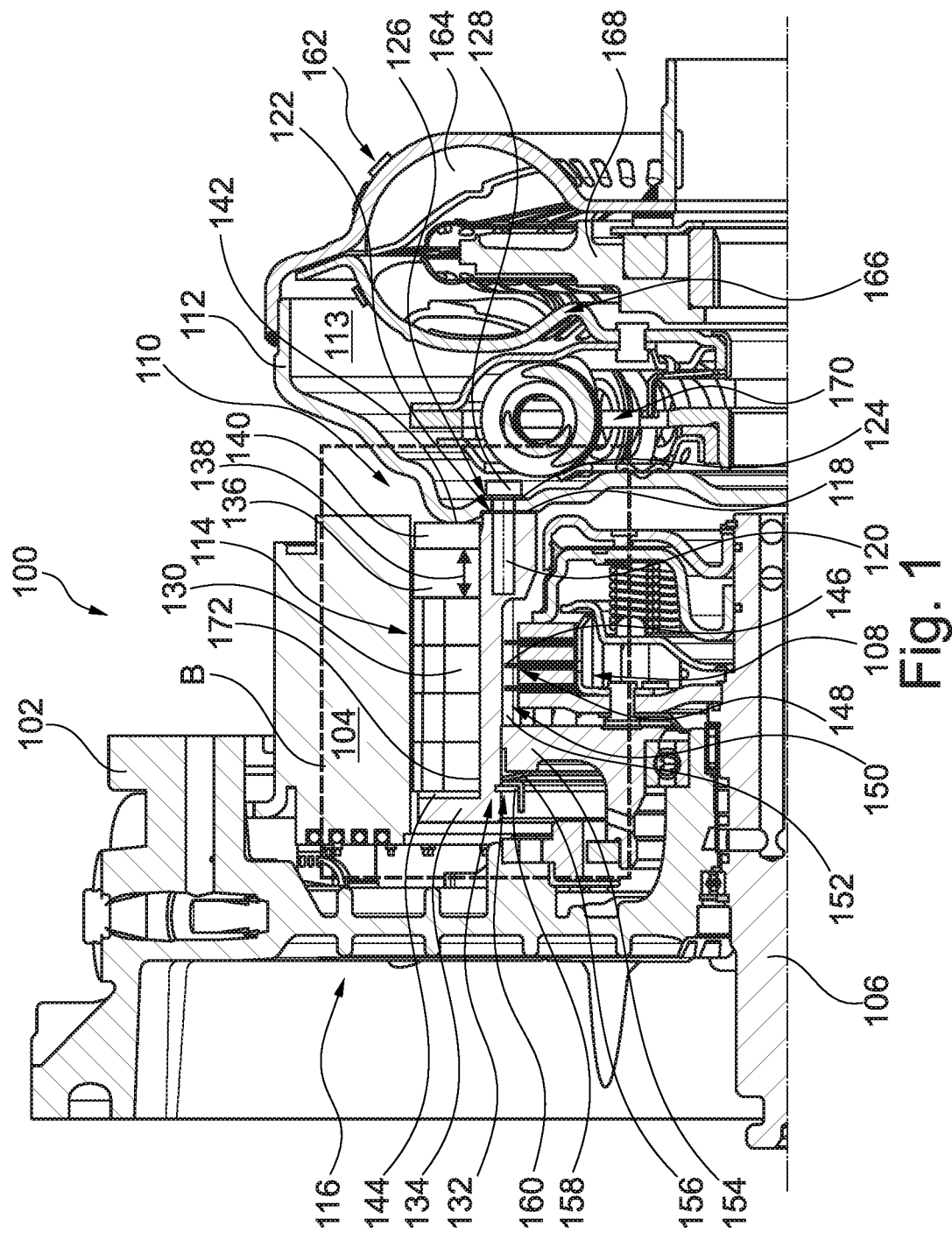
FIG. 1 is a partial cross-sectional view of a hybrid module according to an example aspect.
Figure 2:
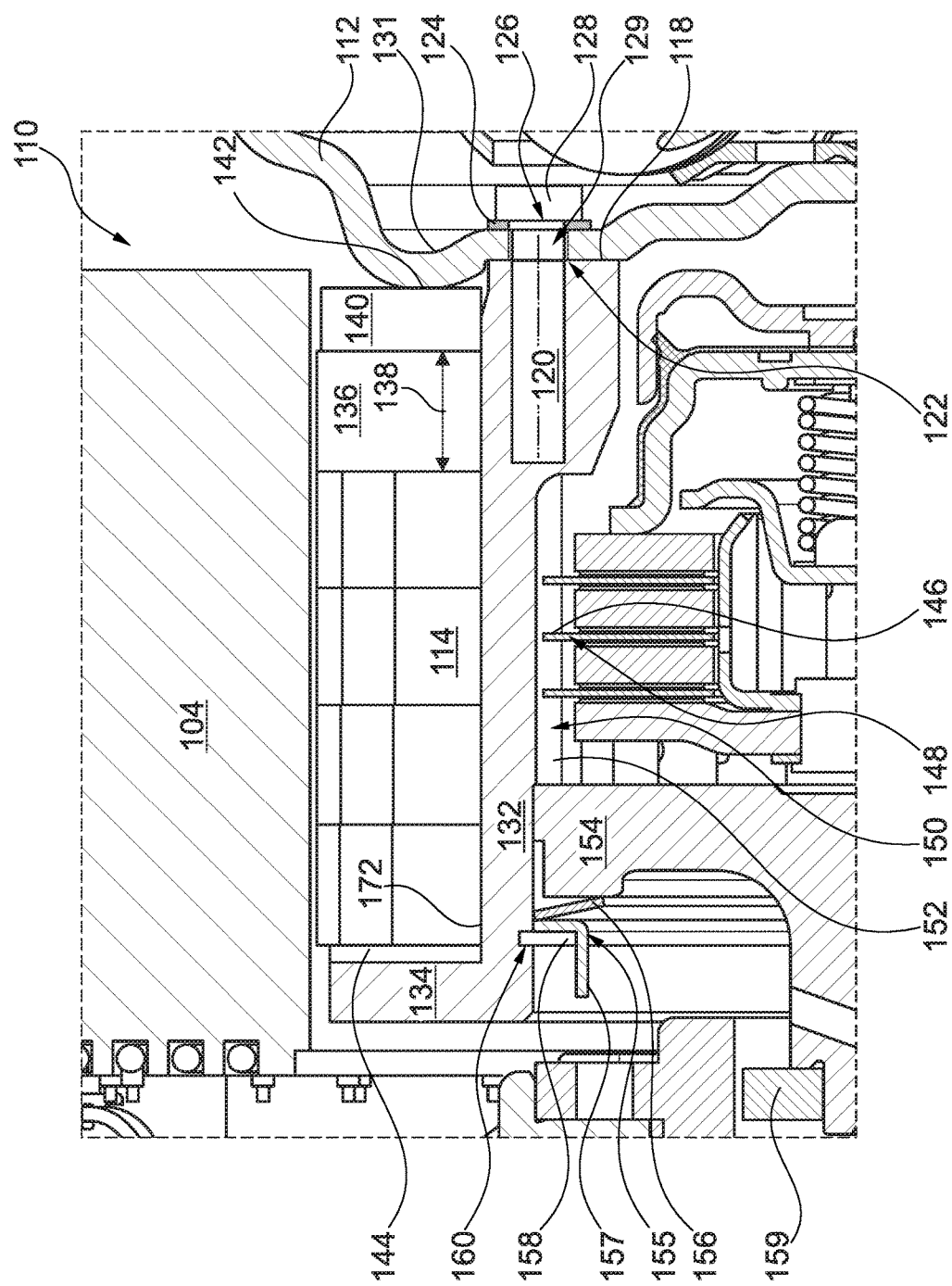
FIG. 2 is a detailed view of Area B of the hybrid module shown in FIG. 1.

The following description is made with reference to FIGS. 1-2. FIG. 1 is a partial cross-sectional view of a hybrid module 100 according to an example aspect. FIG. 2 is a detailed view of Area B of the hybrid module 100 shown in FIG. 1. Hybrid module 100 includes housing 102 with stator 104, electric motor 116, shaft 106, and rotor assembly 110. Rotor assembly 110 includes rotor 114 axially aligned with stator 104 of electric motor 116, rotor carrier 132, clutch assembly 108, and a launch device such as torque converter 162. Torque converter 162 includes a torque converter housing 112 forming a hydraulic chamber 113, impeller blades 164 fixed to the torque converter housing 112, turbine assembly 166, stator assembly 168, and damper assembly 170.

Rotor 114, for electric motor 116, is non-rotatably connected to an outer diameter 172 of rotor carrier 132 and includes at least one rotor segment 130. Although rotor 114 is shown to include a plurality of rotor segments, one of ordinary skill in the art would understand that rotor 114 may include a single large rotor segment in other embodiments depending on the application and individual system constraints. Rotor carrier 132 includes annular ring 134 extending from rotor carrier 132 outer diameter 172. Annular ring 134 may be integrally formed with rotor carrier 132. By integral, it is meant that the rotor carrier 132 and the annular ring 134 are formed from a single piece of material. Other embodiments (not shown) may include a rotor carrier with a separate annular ring axially retained on the rotor carrier by a snap ring, for example. Rotor carrier 132 may be formed from cast steel, for example. Rotor 114 is axially clamped between the torque converter housing 112 and the rotor carrier 132 annular ring 134 to prevent movement of the rotor 114 for improved performance and reduced imbalance.

Rotor carrier 132 is fixed to torque converter housing 112 by bolt 120. Thus, a fixed connection is established between the rotor carrier 132 and torque converter housing 112. Torque is then transmitted from electric motor 116 and a combustion engine (not shown) through clutch assembly 108 to torque converter housing 112 via this fixed connection. Although only a single bolt 120 is shown, a plurality of bolts disposed about a circumference may be used to fix rotor carrier 132 to torque converter housing 112. Seal 118 is disposed between the torque converter housing 112 and the rotor carrier 132 for sealing the torque converter housing 112 to the rotor carrier 132. Seal 118 may be a compressible gasket, for example. Seal 118 is configured to seal around an aperture 122 formed in an axial end of rotor carrier 132. Torque converter housing 112 includes an aperture 129 formed therein that is aligned axially with the aperture 122 formed in the end of the rotor carrier 132. Rotor assembly 110 includes hardened plate 124. Hardened plate 124 is positioned on an inner surface 131 of torque converter housing 112 and includes aperture 126 axially aligned with aperture 122 of rotor carrier 132 and aperture 129 of torque converter housing 112. Bolt 120 is configured to be threaded through the aperture 126 of hardened plate 124, aperture 129 of torque converter housing 112, and then through aperture 122 of rotor carrier 132 for fixing torque converter housing 112 to rotor carrier 132 to prevent movement of rotor 114. In this manner, hardened plate 124 is disposed axially between head 128 of bolt 120 and an inner surface 131 of the torque converter housing 112.

Rotor assembly 110 further includes non-magnetic annular ring 144, annular ring 136, and non-magnetic annular ring 140 positioned on, or extending from, the outer diameter 172 of rotor carrier 132. Non-magnetic annular ring 144 is disposed axially between rotor 114 and rotor carrier 132 annular ring 134. Non-magnetic annular ring 144 is configured to prevent short circuit of the magnets in rotor 114. Annular ring 136 and non-magnetic annular ring 140 are disposed axially between rotor 114 and torque converter housing 112. Annular ring 136 has a thickness 138 that is selected to ensure that rotor 114 is clamped securely between the torque converter housing 112 and the rotor carrier 132 annular ring 134. That is, the thickness 138 is selected such that, when the bolt 120 is tightened, a force from the bolt 120 ensures a friction fit such that the rotor 114 does not rotate relative to the rotor carrier 132 or the torque converter housing 112. In some embodiments (not shown), annular rings 136 and 140 may be combined into a single non-magnetic annular ring with a thickness selected to ensure that the rotor 114 is clamped securely between rotor carrier 132 annular ring 134 and torque converter housing 112. Torque converter housing 112 includes machined support surface 142 and non-magnetic annular ring 140 contacts the machined support surface 142. Annular rings 144, 136, 140 and rotor 114 are slip fit to the rotor carrier 132 outer diameter 172.

With continual reference to FIG. 1, clutch assembly 108 includes clutch plate 148 drivingly engaged with rotor carrier 132. For example, the clutch plate 148 and rotor carrier 132 include complementary splines 146 and 150, respectively, in driving engagement. The rotor carrier spline 150 includes castellated portion 152. Rotor assembly 110 also includes rotor carrier flange 154, spring 156, snap ring 158, and retention element 155. Spring 156 may be a diaphragm spring, for example. The spring 156 is disposed axially between the snap ring 158 and the rotor carrier flange 154. Rotor carrier 132 includes groove 160 and the snap ring 158 is disposed in the groove 160. The spring 156 clamps the rotor carrier flange 154 between the snap ring 158 and the castellated portion 152. Retention element 155 is disposed between the spring 156 and the snap ring 158. Retention element 155 may be a shim having at least one tab 157 bent toward the snap ring 158 such that the at least one tab 157 contacts at least a portion of the snap ring 158 to secure the snap ring 158 in the groove 160. Rotor carrier 132 is arranged to non-rotatably engage rotor resolver 159.

Figure 3:
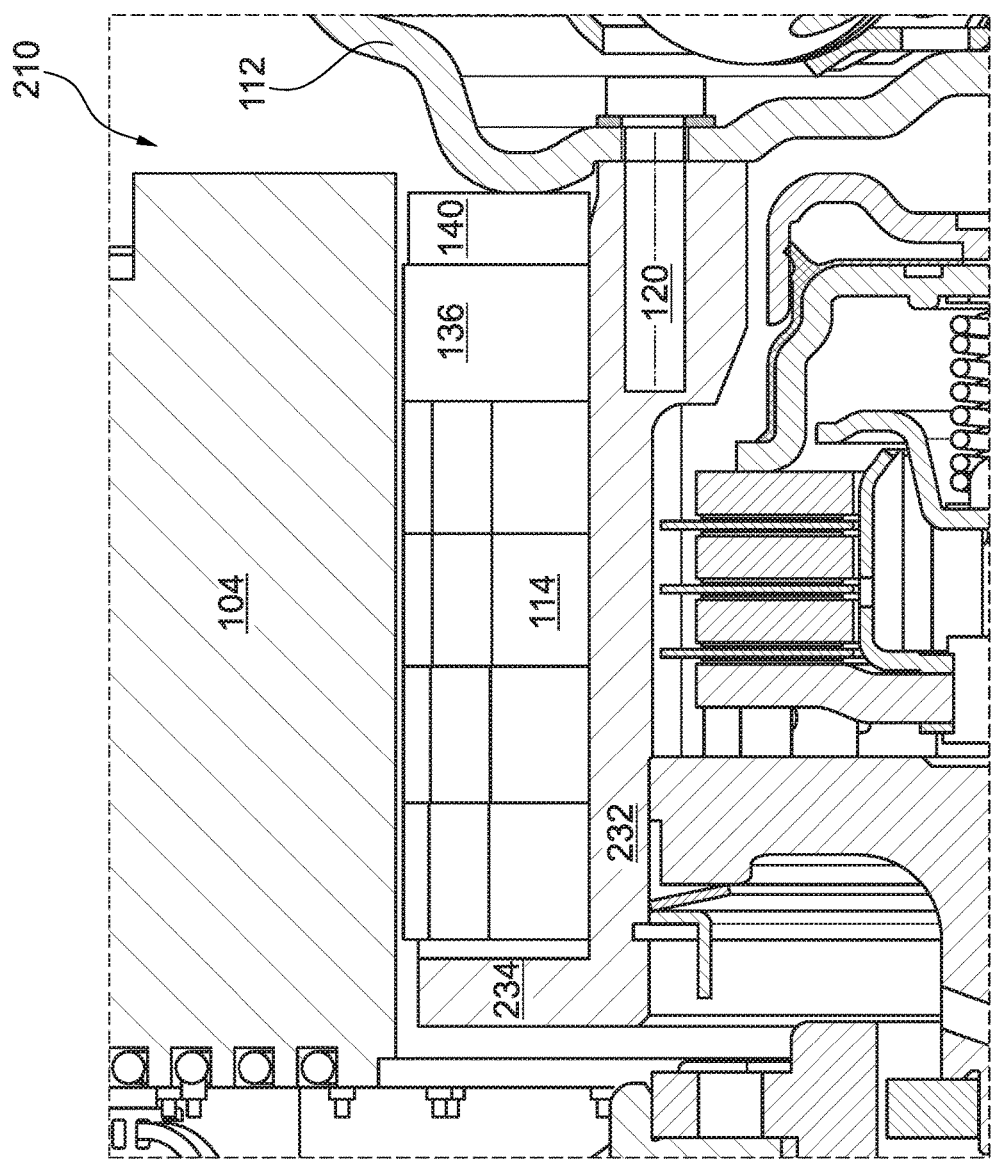
FIG. 3 is a detailed view of an alternative embodiment of Area B of the hybrid module shown in FIG. 1.

The following description is made with reference to FIG. 3. FIG. 3 is a detailed view of an alternative embodiment of Area B of hybrid module 100 shown in FIG. 1. Rotor assembly 210 is similar to rotor assembly 110 and 2XX labels generally correspond to 1XX labels except as described below. Rotor carrier 232 is formed from a non-magnetic or non-ferrous material. For example, rotor carrier 232 may be formed of gold, aluminum, beryllium, lead, magnesium, nickel, platinum, zinc, copper and/or stainless steel. The use of a non-magnetic material for rotor carrier 232 obviates the need for non-magnetic ring 144 shown in rotor assembly 110 of FIGS. 1 and 2. Rotor carrier 232 further includes integral annular ring 234.

Figure 4:
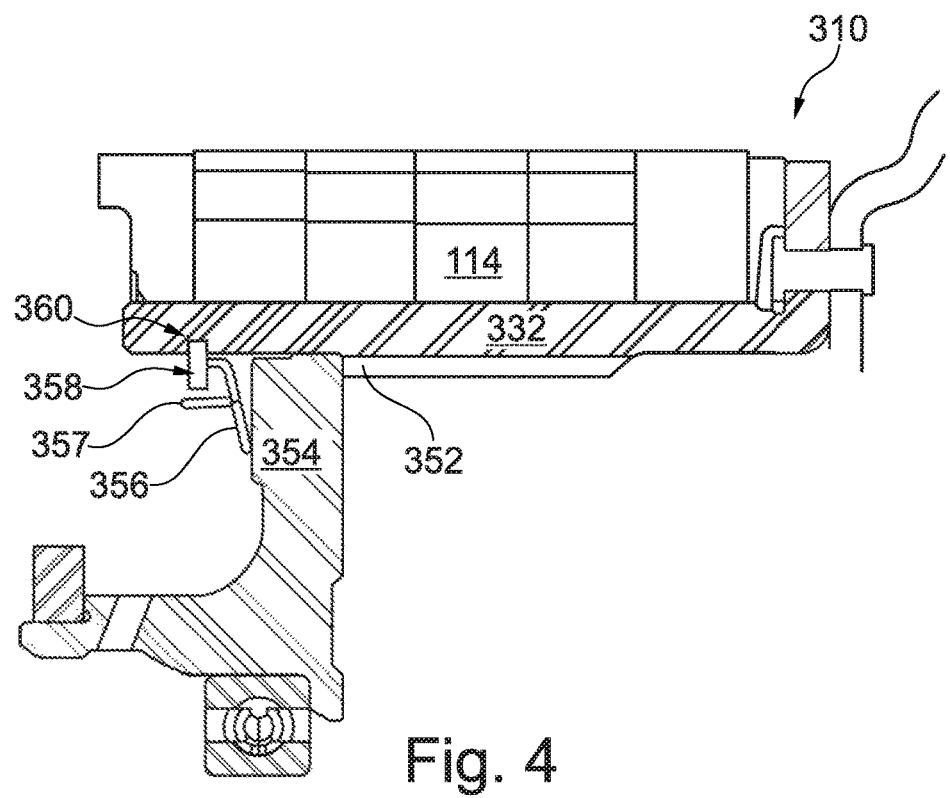
FIG. 4 is a detailed view of an alternative embodiment of the rotor carrier assembly shown in Area B of FIG. 1.

The following description is made with reference to FIG. 4. FIG. 4 is a detailed view of an alternative embodiment of the rotor carrier assembly shown in Area B of FIG. 1. Rotor assembly 310 is similar to rotor assembly 110 and 3XX labels generally correspond to 1XX labels except as described below. Rotor assembly 310 includes rotor carrier 332 with castellated portion 352 and groove 360. Snap ring 358 is disposed within groove 360 of rotor carrier 332. Spring 356 is disposed axially between snap ring 358 and rotor carrier flange 354. Spring 356 may be a diaphragm spring, for example. Spring 356 may also include at least one retaining tab 357 positioned under the snap ring 358 to secure the snap ring 358 in the groove 360 of rotor carrier 332. The at least one retaining tab 357 is integrally formed with the spring 356. The spring 356 clamps the rotor carrier flange 354 between the snap ring 358 and the castellated portion 352.

Figure 5:
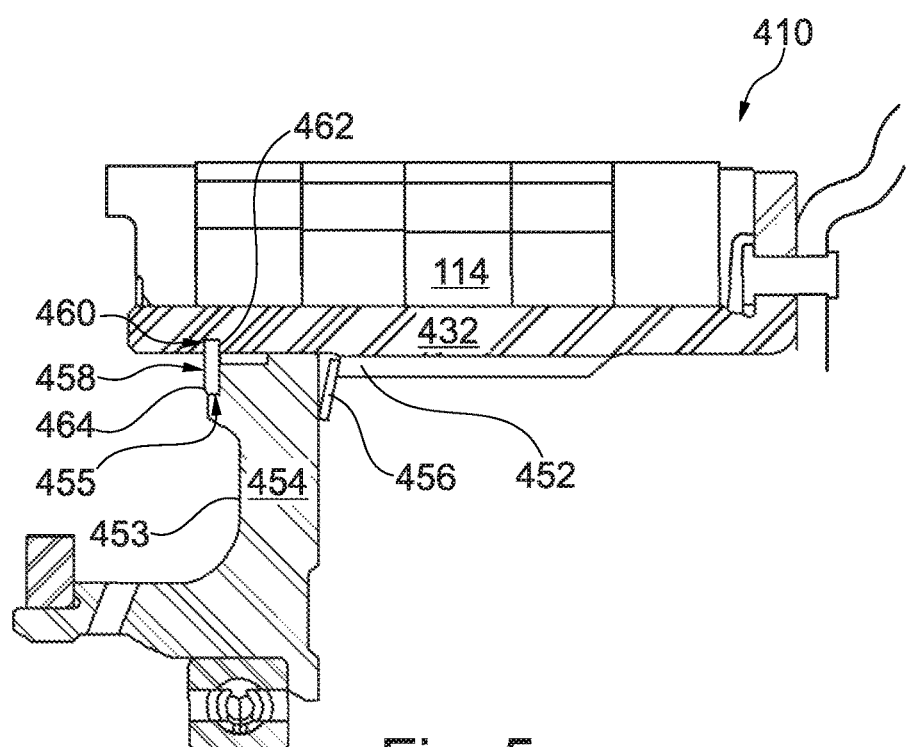
FIG. 5 is a detailed view of another alternative embodiment of the rotor carrier assembly shown in Area B of FIG. 1.

The following description is made with reference to FIG. 5. FIG. 5 is a detailed view of another alternative embodiment of the rotor carrier assembly shown in Area B of FIG. 1. Rotor assembly 410 is similar to rotor assembly 110 and 4XX labels generally correspond to 1XX labels except as described below. Rotor assembly 410 includes a rotor carrier 432 having castellated portion 452 and groove 460. Rotor assembly 410 further includes a rotor carrier flange 454 including an inner diameter 453 and a groove 455 formed therein. Grooves 460 and 455 are radially aligned. Snap ring 458 includes a first end 462 opposite a second end 464, wherein the snap ring 458 first end 462 is disposed in groove 460 of rotor carrier 432 and the snap ring 458 second end 464 is disposed in groove 455 of rotor carrier flange 454. A spring 456 is disposed axially between the rotor carrier flange 454 and the castellated portion 452. The spring 456 urges the rotor carrier flange 454 into contact with the rotor carrier 432.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE CHARACTERS

100 Hybrid Module
102 Housing
104 Stator
106 Shaft
108 Clutch Assembly
110 Rotor Assembly
112 Torque Converter Housing
113 Hydraulic Chamber
114 Rotor
116 Electric Motor
118 Seal
120 Bolt
122 Aperture
124 Hardened Plate
126 Aperture
129 Aperture
128 Head of Bolt
130 Rotor Segment
131 Inner Surface
132 Rotor Carrier
134 Annular Ring
136 Annular Ring
138 Thickness
140 Non-Magnetic Annular Ring
142 Machined Support Surface
144 Non-Magnetic Annular Ring
146 Spline
148 Clutch Plate
150 Spline
152 Castellated Portion
154 Rotor Carrier Flange
155 Retention Element
156 Spring
157 Tab
158 Snap Ring
159 Resolver
160 Groove
162 Torque Converter
164 Impeller Blades
166 Turbine Assembly
168 Stator Assembly
170 Damper Assembly
172 Outer Diameter
210 Rotor Assembly
232 Rotor Carrier
234 Integral Annular Ring
310 Rotor Assembly
332 Rotor Carrier
352 Castellated Portion
354 Rotor Carrier Flange
356 Spring
357 Retaining Tab
358 Snap Ring
360 Groove
410 Rotor Assembly
432 Rotor Carrier
452 Castellated Portion
453 Inner Diameter
454 Rotor Carrier Flange
455 Groove
456 Spring
458 Snap Ring
460 Groove
462 First End
464 Second End

What we claim is:

1. A rotor assembly, comprising:
  a torque converter including a housing forming a hydraulic chamber;
  a rotor for an electric motor;
  a rotor carrier non-rotatably connected to the rotor, wherein the rotor carrier is fixed to the torque converter housing;
  a rotor carrier flange;
  a spring; and,
  a snap ring, wherein:
    the rotor carrier includes a groove and a castellated portion;
    the snap ring is disposed in the groove; and,
    the spring clamps the rotor carrier flange between the snap ring and the castellated portion.

2. The rotor assembly of claim 1 wherein the spring is a diaphragm spring.

3. The rotor assembly of claim 1 wherein the spring is disposed axially between the snap ring and the rotor carrier flange.

4. The rotor assembly of claim 1, further comprising a retention element disposed between the spring and the snap ring.

5. The rotor assembly of claim 4 wherein:
  the retention element is a shim having at least one tab; and,
  the at least one tab is bent toward the snap ring such that the at least one tab contacts at least a portion of the snap ring to secure the snap ring in the groove.

6. The rotor assembly of claim 1 wherein the spring includes at least one retaining tab positioned under the snap ring to secure the snap ring in the groove.

7. The rotor assembly of claim 6 wherein the at least one retaining tab is integrally formed with the spring.

8. A rotor assembly, comprising:
  a torque converter including a housing forming a hydraulic chamber;
  a rotor for an electric motor;
  a rotor carrier non-rotatably connected to the rotor, wherein the rotor carrier is fixed to the torque converter housing;
  a rotor carrier flange including an inner diameter;
  a spring; and, a snap ring including a first end opposite a second end, wherein:
  the rotor carrier includes a groove and a castellated portion;
  the snap ring first end is disposed in the rotor carrier groove; and,
  the spring urges the rotor carrier flange into contact with the rotor carrier.

9. The rotor assembly of claim 8 wherein the spring is disposed axially between the rotor carrier flange and the castellated portion.

10. The rotor assembly of claim 8 wherein:
  the rotor carrier flange includes a groove formed in the inner diameter; and
  the snap ring second end is disposed in the groove of the rotor carrier flange.

11. The rotor assembly of claim 10 wherein the rotor carrier groove is radially aligned with the rotor carrier flange groove.

* * * * *